Dec. 23, 1952  M. M. M. BILLON  2,622,708
AUTOMATIC BRAKE CONTROL DEVICE
Filed May 15, 1947  4 Sheets-Sheet 1
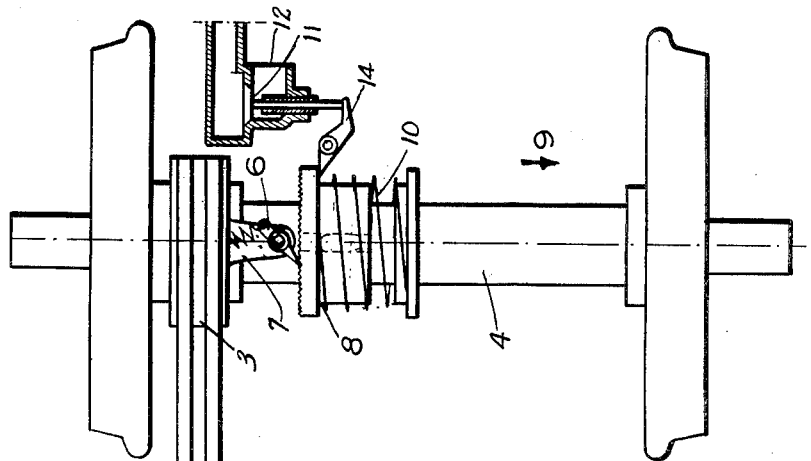
FIG.1
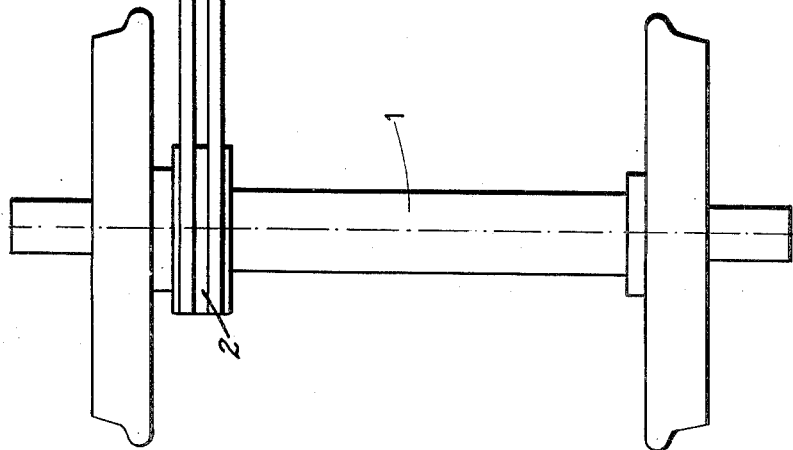
Inventor
MARCEL MARIE MAURICE BILLON
By Haseltine, Lake & Co.
Agents

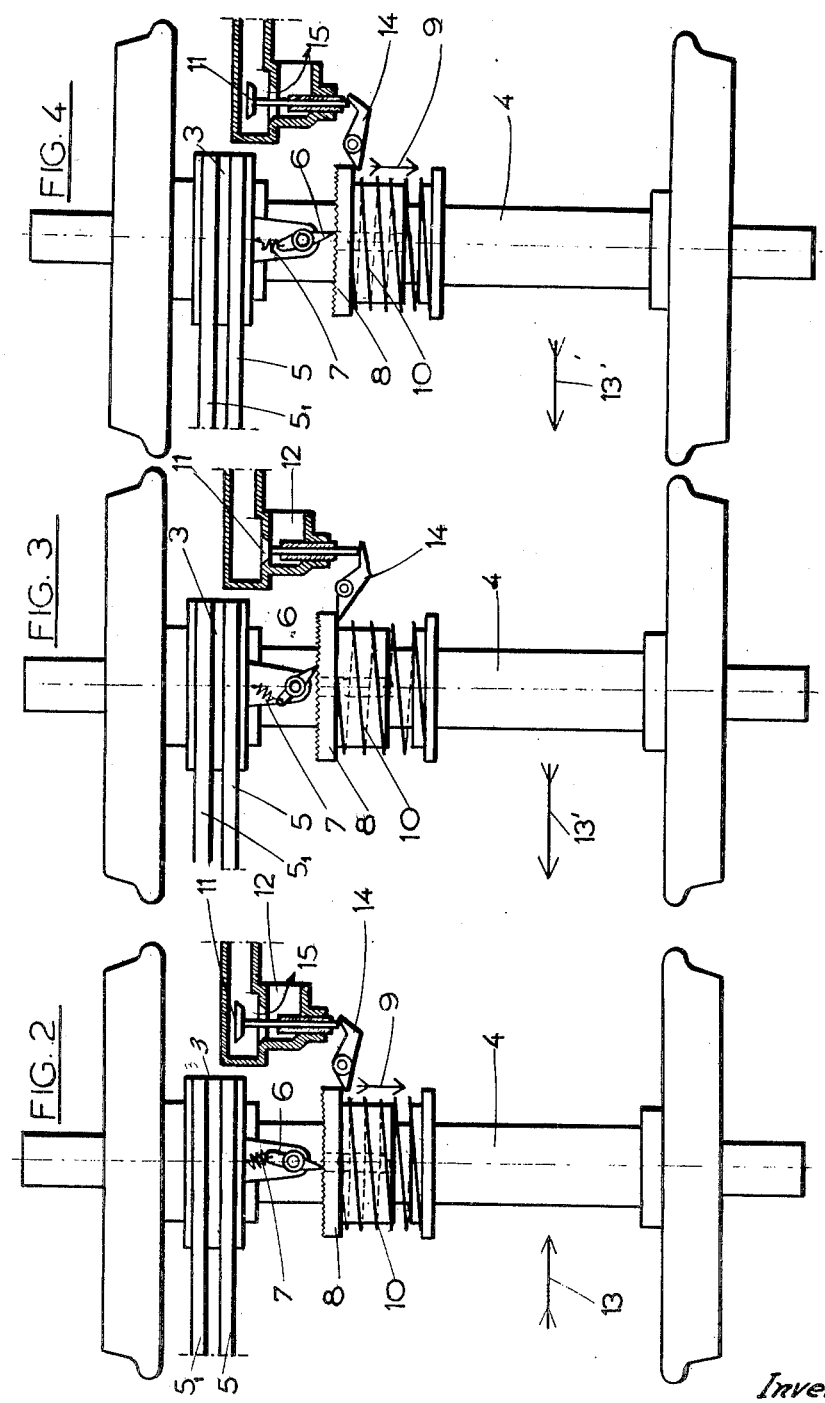

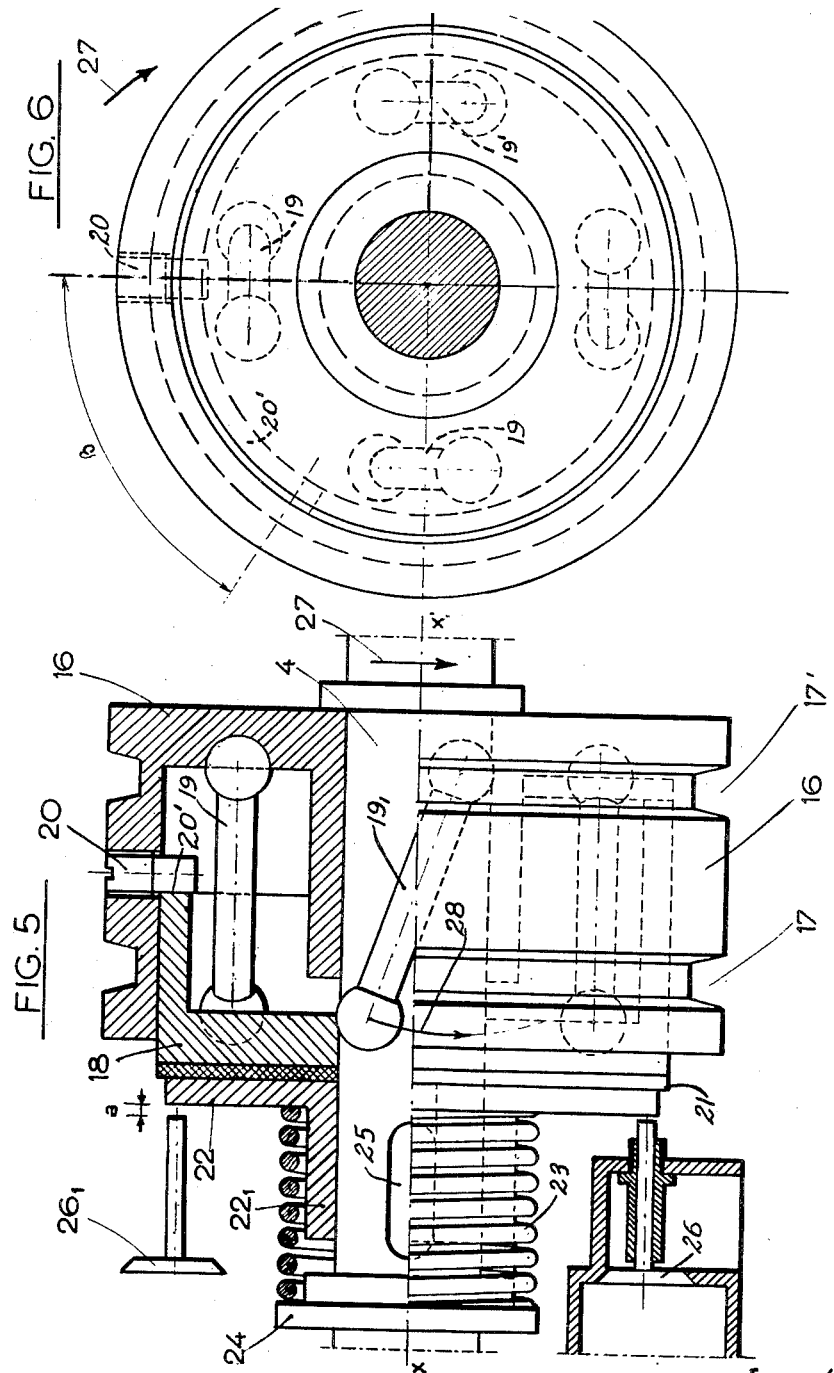

Patented Dec. 23, 1952

2,622,708

UNITED STATES PATENT OFFICE 2,622,708

AUTOMATIC BRAKE CONTROL DEVICE

Marcel Marie Maurice Billon, Paris, France, assignor to Tecalemit, Societe Anonyme, Paris, France, organized under the laws of France Application May 15, 1947, Serial No. 748,320
In France June 20, 1946

4 Claims. (Cl. 188—181)

This invention relates to an automatic brake control device.

Braking devices for vehicles such as railway carriages are already known which comprise devices preventing freezing of the brakes on the axles while making it possible to maintain the braking effect in the vicinity of the desired maximum. Such devices are intricate in construction and do not act with the great rapidity which is required.

In certain devices of this type, mechanisms are used which effect a comparison between the speeds of rotation of a first more braked axle and a second less braked axle, said speeds being substantially the same so long as there is no freezing of the more braked axle. The reduction of braking power is automatically controlled when the speed difference between both axles exceeds a certain value, that is to say when the more braked axle begins to freeze, the reduction of braking power making it possible to prevent freezing while keeping the power exactly at the desired braking maximum. Experience shows that such mechanisms are generally lacking in sensitivity, rapidity of response and power.

The present invention has more particularly for its object to remedy these disadvantages and to make it possible to increase the sensitivity, the rapidity and the power of the known methods.

For this purpose, the invention relates to an automatic brake control device as above stated and wherein the movement of rotation of the more braked axle is transmitted to a control member, located on the less braked axle, in a ratio which is different from unity, so that the control member rotates with a speed which is slightly different from that of the axle on which it is located and the reduction of braking power is achieved automatically when the difference between the speeds of rotation of the less braked axle and the control member becomes zero and changes its sign.

The invention will now be described in detail, in connection with two preferred examples of construction of the device, reference being made to the accompanying drawings wherein:

Figure 1 shows the control device in the braking position without freezing on two axles of a bogie.

Figure 2 is a partial plan view of the device of Figure 1 showing the operation of the same at the beginning of freezing.

Figure 3 is a partial plan view showing the device of Figure 1 in the braking position without freezing but for a reverse direction of travel of the vehicle.

Figure 4 is a partial plan view of the device as shown in Figure 1 in operative position at the beginning of freezing.

Figure 5 is a partial axial sectional view showing another form of execution of the control device.

Figure 6 is an orthogonal projection of the device of Figure 5.

Figure 7:
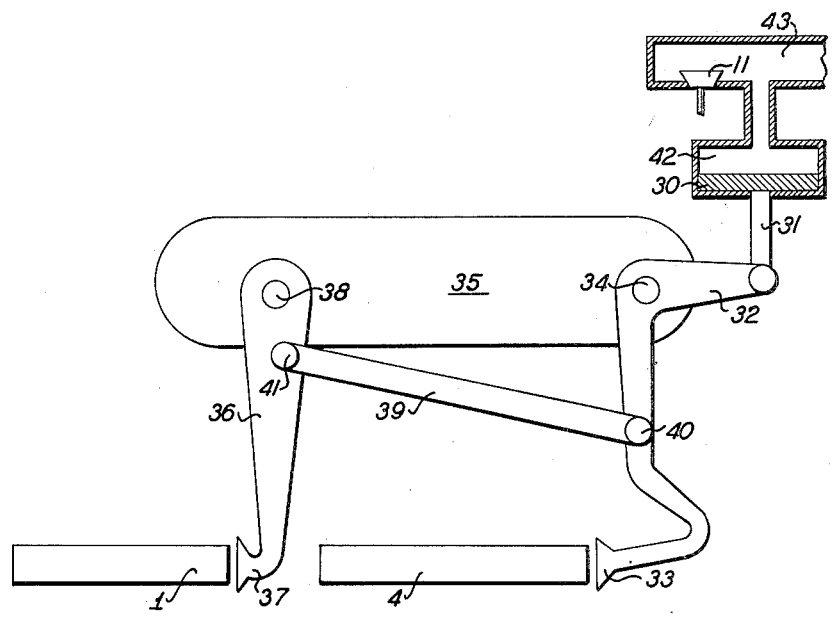
Figure 7 shows one form of differential braking device suitable for use with the brake control device of the present invention.

The complete device shown in Figure 1 consists of a grooved pulley 2 fast with the axle 1 of a bogie. Said grooved pulley 2 is aligned with a loose pulley 3 freely journalled on the second axle 4 of a bogie.

Both pulleys are connected in their movements through trapezoidal belts 5 and $5^1$, and the pitch diameters of the grooves of pulley 2 are slightly higher than the pitch diameters of the grooves of pulley 3. As a result, when the axle 1 rotates, the loose pulley 3 on axle 4 has a speed of rotation slightly higher than the speed of rotation of axle 4.

The pulley 3, freely journalled on axle 4, cannot be shifted axially thereon. It drives, during its movement of rotation, one or more pawls 6 urged through the traction spring 7 so as to assume a position parallel to the axis of rotation of axle 4.

The end of pawl 6 engages a toothed wheel 8 fast with axle 4 in its movement of rotation but mounted on a sliding key so that it can be pushed back against the action of spring 10 in the direction of arrow 9 (Figure 2). Assuming that the vehicle has pneumatic brake lines, a valve 11 is controlled through a rocker 14 actuated by the axial shifting of the toothed wheel 8.

Said valve 11 which is located behind the toothed wheel 8 closes an exhaust opening 12 communicating with the pneumatic brake lines.

The operation of the control device is as follows:

The direction of travel of the bogie being given by the arrow 13 (Figures 1 and 2) the pulley 3 rotates very slowly on axle 4 in the direction of travel, the pawl 6 acting as in a free wheel.

The axle 1 is by construction more braked than axle 4 as will be hereafter described in detail. If the retarding strain applied to axle 1 exceeds the local value of the adhesion then a freezing of the axle begins to occur on said axle 1 before it occurs on axle 4.

As soon as the wheels of axle 1 begin to slide to such an extent that the speed of their axle is reduced by more than X% of the speed of axle 4, X being equal to the ratio of the pitch diameters of both pulleys, the direction of rotation of pulley 3 is reversed with respect to that of wheel 8. The end of the pawl engages between the teeth of wheel 8 (Figure 2) and pushes said wheel back in the direction of arrow 9.

This movement results in an actuation of the rocker 14 which raises valve 11 so that the compressed air escapes from the brake lines in the direction of arrow 15.

Axle 1 then resumes a speed equal to that of axle 4 which results in valve 11 being applied again on its seat after a very small movement of the axle.

The above described control device operates in an identical manner for a reverse direction of travel of the vehicle (Figures 3 and 4).

This identical operation is obtained by an automatic reversal of the direction in which pawl 6 acts at the moment when the vehicle is reversed.

The reversing of the direction of travel results in pawl 6 being arrested by the teeth of the toothed wheel 8 and valve 11 being completely raised. This has no inconvenient effect, however, since the brake lines are empty at this moment.

Any slowing down of the rotation of axle 1 resulting from the beginning of a freezing action on said axle causes again the interference of pawl 6 with the teeth of wheel 8 and the axial recoil of said wheel (Figure 4) in the direction of arrow 9, the operation of the device being the same as described previously.

In another form of the device the ratchet mechanism can be replaced by any other convenient mechanism comprising free wheels or, more generally, by devices in which an interhooking action is used.

Figures 5 and 6 show an interhooking device which works noiselessly.

In said device the hollow pulley 16 which comprises the grooves 17, 17' for trapezoidal belts is mounted loosely on axle 4. As in the preceding case said pulley is driven through belts passing around a pulley having a larger diameter and fast with axle 1 (not shown) and rotates with a speed slightly higher than the speed of axle 4 on which it is journalled.

Centered inside pulley 16 is a casing 18 also loosely mounted on axle 4. Ball-ended connecting rods 19, 19¹ . . . come to rest with their ends in half-spherical recesses provided in the inner surfaces of pulley 16 and casing 18 respectively. Under such conditions any pressure exerted on casing 18 causing it to engage inside pulley 16 will result in a movement of rotation of casing 18 with respect to pulley 16 and in a tilting movement of the connection rods 19, 19¹ . . . with respect to the axis of axle 4.

A screw 20 secured in pulley 16 serves as a stop in either direction for the rotation of the casing 18 with respect to pulley 16, the stopping occurring before the casing comes to engage the bottom of pulley 16.

The U-shaped slot 20' provided in casing 18 for this purpose permits of an angular shifting of the casing with respect to the pulley which is equal to angle B (Figure 6). Under these conditions, tilting of the ball-ended connecting rods 19, 19¹ . . . is, for instance, that which is shown in the drawings.

On the other hand, a rotation of casing 18 by an angle B with respect to pulley 16 first causes the recoil of casing 18 with respect to pulley 16, straightening out connecting rods 19 by an angle B/2 and then their return to a symmetrical tilting with respect to axis X—X' of axle 4 with the return of the casing to its original position.

A plate 21 of a material having a strong adhesion is inserted between the outer surface of the casing 18 and the flange 22 of the sliding sleeve 22¹. Said sleeve is applied against the plate 21 through spring 23 the other end of which abuts against shoulder 24 fast with axle 4.

The sliding sleeve 22 mounted on key 25 rotates with the same speed as axle 4. Valves 26 and 26¹ which control the opening of exhaust ports in the brake lines are arranged so that any straightening out of connecting rods 19 and 19¹, causing the recoil of casing 18 when spring 23 is compressed will insure their opening. Valve 26¹ being farther than valve 26 from the surface of flange 22 the recoil of the unit comprising casing 18, disc 21 and flange 22 first causes the opening of valve 26, the opening of 26¹ being obtained only after a recoil of more than the distance $a$.

The operation of the control device is as follows:

The rotation of the axle is in the direction of arrow 27. Since pulley 16 is constantly in advance with respect to axle 4 in this direction of rotation casing 18 is driven with the same speed as pulley 16 through stop screw 20, the connecting rods 19, 19¹ and so on . . . which are pressed between casing 18 and pulley 16 by spring 23 acting upon flange 22 and disc 21 are arranged in the position shown in the drawing. The difference of rotation between casing 18 and flange 22 causes a sliding of plate 21 between both members. Since spring 23 serves only to start a later interhooking action it is rather weak and the rubbing is of no great importance.

If, at a certain moment, freezing of axle 1 causes a slowing down of the movement of pulley 16, said slowing down being assumed higher than the sliding value, casing 18 resting against the surface of disc 21 begins to rotate with respect to pulley 16 while, at the same time, causing connecting rods 19, 19¹ . . . to straighten out and repeal the casing 18, disc 21 and flange 22 on axle 4. Valve 26 is immediately raised which causes an escape of air from the brake lines. Flange 22 may be so arranged if the recoil continues, valve 26¹ and any further valves associated therewith may in turn be actuated which eventually will completely eliminate freezing.

For a reversed direction of travel the connecting rods are tilted in the direction of arrow 28 and come to lie after a rotation of the casing by an angle B with respect to the pulley in a position symmetrical to that which is shown in the drawing.

The operation of the device is then the same as previously.

Figure 7 shows a differential braking device which enables axle 4 to be more strongly braked than axle 1. The piston 30 is connected by a piston rod 31 to a bell-crank lever 32 pivoted at 34 on the vehicle frame 35 and having at its free end a brake shoe 33 for applying braking power to the axle 4. A lever 36 having a brake shoe 37 for applying braking power to the axle 1 is pivoted at 38 on the vehicle frame 35. The bell-crank lever 32 and lever 36 are mutually interconnected by a connecting rod 39 pivoted to the bell-crank lever 32 at 40 and to the lever 36 at 41, the pivot points of the connecting rod at 40 and 41 being so calculated that the turning moment of the bell-crank lever 32 with the brake shoe 33 is shorter relatively to the pivot point 40 than the turning moment of the lever 36 and brake shoe 37 relatively to the pivot point 41. This arrangement enables the application by the brake shoe 33 to the axle 4 of a greater braking power than that applied by the brake shoe 37 to the axle 1. As will be seen from Figure 7, sliding movement of the piston 30 in the cylinder 42 is controlled by the valve 11 also shown in Figure 1, thereby controlling the exhaust to the atmosphere of brake line 43 in which there exists a pressure corresponding to the braking power controlled by the operator.

This differential braking device is described merely by way of example and it is obvious that the same effect could be obtained in an entirely hydraulic or pneumatic braking system wherein the actuating cylinder and piston of brake shoe 33 would be of larger diameter than the actuating cylinder and piston of brake shoe 37 thereby applying a greater force to axle 4 than to axle 1.

I claim:

1. In an automatic brake control device, a first vehicle axle, a second vehicle axle, a brake shoe cooperating with the first vehicle axle, a brake shoe cooperating with the second vehicle axle, a brake cylinder, means for establishing in the cylinder a pressure corresponding to the braking power to be applied, a valve controlling the exhaust of pressure medium from the cylinder to vary the pressure in the cylinder, a piston sliding in the cylinder, means connecting the piston to the brake shoes thereby to control the braking power in such a manner that the power applied to the first axle is at all times greater than that applied to the second axle, a control member rotatable around the second less braked axle, means for transmitting the movement of rotation of the first more braked axle to the control member rotating on the second less braked axle in a ratio slightly less than unity in such a manner that the said control member rotates relatively to the second less braked axle when no braking power is applied thereby to enable a decrease of the speed of rotation of said control member in response to deceleration of the second less braked axle in such a manner that the speed of said control member relatively to said second axle passes through zero and changes in direction, and means connected to said control member and operative to open said valve upon the relative speed of said control member passing through zero and changing sign thereby to decrease the braking power applied by the brake shoes.

2. In an automatic brake control device as claimed in claim 1, a pawl rotatable with said control member and a circular ratchet rotatable with said second axle and slidable axially thereon, said pawl being adapted to engage with said ratchet in such manner that said control member operates normally as a free wheel mechanism and whereby upon cancellation of the relative speed of rotation of said control member and change of direction thereof, said pawl rotates around its own axis and causes said ratchet to slide axially and to act upon said valve.

3. A device as in claim 1 wherein said last named means comprise a drum rotatable with said second axle and axially slidable thereon, and means connected to said control member and drum to cause rotation thereof in unison in a given direction and relative axial displacement upon relative rotation in the other direction, said device further comprising means operably connected to said valve and extending into the path of axial movement of said drum.

4. A device as in claim 1 wherein said last named means comprise a first housing rotatable with said control member, a second housing rotatable with said second axle and slidable axially thereon, a plurality of articulated connecting rods pivoted to said first and second housings and of a length to displace said housings axially from each other when said rods extend parallel to said axle, a spring urging said housings together and causing said rods to take up an inclined position relatively to said second axle and means extending from said valve into the path of movement of said second housing in a position to be engaged by said second housing when axially displaced from said first housing upon the extension of said rods from an inclined position to a position parallel to said second axle.

MARCEL MARIE MAURICE BILLON.

REFERENCES CITED

The following references are of record in the file of this patent:

UNITED STATES PATENTS

| Number | Name | Date |
|---|---|---|
| 1,122,225 | Abel | Dec. 22, 1914 |
| 2,038,145 | Cook et al. | Apr. 21, 1936 |
| 2,038,146 | Cook et al. | Apr. 21, 1936 |
| 2,038,147 | Cook et al. | Apr. 21, 1936 |
| 2,132,914 | Fitch | Oct. 11, 1938 |

FOREIGN PATENTS

| Number | Country | Date |
|---|---|---|
| 329,240 | Italy | Sept. 3, 1935 |